United States Patent
Noda et al.

(10) Patent No.: US 7,805,596 B2
(45) Date of Patent: Sep. 28, 2010

(54) HIGHLY INTEGRATED MULTIPROCESSOR SYSTEM

(75) Inventors: Shinji Noda, Chiba (JP); Takeshi Kono, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 38 days.

(21) Appl. No.: 10/587,553

(22) PCT Filed: Oct. 31, 2005

(86) PCT No.: PCT/JP2005/020000

§ 371 (c)(1),
(2), (4) Date: Jul. 30, 2007

(87) PCT Pub. No.: WO2006/059444

PCT Pub. Date: Jun. 8, 2006

(65) Prior Publication Data

US 2007/0283135 A1 Dec. 6, 2007

(30) Foreign Application Priority Data

Dec. 3, 2004 (JP) ............................. 2004-350702

(51) Int. Cl.
*G06F 9/00* (2006.01)
*G06F 9/44* (2006.01)
(52) U.S. Cl. ......................................... 712/244; 712/34
(58) Field of Classification Search ................. 712/227, 712/28, 31, 34–35, 230–231, 244
See application file for complete search history.

(56) References Cited

U.S. PATENT DOCUMENTS

| 5,706,478 | A | * | 1/1998 | Dye | ............................. | 345/503 |
| 6,108,767 | A | * | 8/2000 | Damron | ....................... | 712/202 |
| 6,671,196 | B2 | * | 12/2003 | Civlin | ......................... | 365/49.1 |
| 6,807,620 | B1 | * | 10/2004 | Suzuoki et al. | ................ | 712/2 |
| 6,996,677 | B2 | * | 2/2006 | Lee et al. | ...................... | 711/132 |
| 2002/0049894 | A1 | | 4/2002 | Moyer et al. | | |
| 2003/0120897 | A1 | | 6/2003 | Schlansker | | |
| 2004/0103252 | A1 | * | 5/2004 | Lee et al. | ...................... | 711/132 |
| 2007/0101317 | A1 | * | 5/2007 | Shoji et al. | ................... | 717/131 |

FOREIGN PATENT DOCUMENTS

JP 57-143642 A 9/1982

(Continued)

OTHER PUBLICATIONS

Machine Translation of Japanese Patent H09-231093.*

(Continued)

*Primary Examiner*—Aimee J Li
(74) *Attorney, Agent, or Firm*—Katten Muchin Rosenman LLP (57) ABSTRACT

In a multi-processor system (100), when a first processor interrupt generation unit (24) has executed a call command or a jump command in a main routine being executed, it generates an interrupt to a second processor. Upon reception of the interrupt from the interrupt generation unit (24), the second processor saves the return address for returning to the main routing upon completion of the subroutine processing called by the call command in a main memory area (54) other than the first processor or generates a call destination address and a jump destination address and reports it to the first processor. Thus, the first processor can be a small-size circuit capable of flexibly performing processing.

13 Claims, 4 Drawing Sheets

FOREIGN PATENT DOCUMENTS

| | | | |
|---|---|---|---|
| JP | 09231093 A | * | 9/1997 |
| JP | 2002-202964 A | | 7/2002 |
| JP | 2003-36169 A | | 2/2003 |

OTHER PUBLICATIONS

Supplementary European Search Report dated Mar. 6, 2009, from the corresponding European Application.

European Search Report dated Oct. 21, 2009, from the corresponding European Application.

International Preliminary Report on Patentability and Written Opinion of the International Searching Authority with translation dated Jun. 5, 2007, for corresponding International Patent Application PCT/JP2005/020000.

* cited by examiner

|  | 31 | 23 | 15 | 0 |
|---|---|---|---|---|
| cpu call | E 1 | O 1 | addr 16-31 | |
| halt | E 2 | — | addr 0-15 | |

FIG. 6 ns, papers, and the like may also be practiced as additional modes of the present invention.
HIGHLY INTEGRATED MULTIPROCESSOR SYSTEM This application is the National Stage of International Application No. PCT/JP2005/020000, filed Oct. 31, 2005, which claims the benefit under 35 U.S.C. 119 (a-e) of Japanese Application No. JP 2004-350702 filed Dec. 3, 2004, which

BACKGROUND OF THE INVENTION

1. Field of the Invention

The invention relates to a system which uses computer processors of multiprocessor configuration, and a method of executing a program in the system.

2. Description of the Related Art

Real-time multimedia applications are becoming increasingly important. These applications are now more frequently being processed by multiprocessor systems. For example, in game consoles and other apparatuses in which high-speed and high-definition image displays are required, a graphics processing unit (GPU) performs graphics processing in cooperation with a main processor for high-speed displays.

Meanwhile, portable electronic apparatuses such as game consoles, cellular phones, and personal digital assistances (PDA) are steadily decreasing in size. Control circuits require higher integration over a smaller area in which the processors, memories, and the like are implemented.

The smaller sizes and higher integration of the control circuits also reduce the available areas for implementing registers and other hardware resources often used to ensure the smooth operation of programs and the like. If such hardware resources decrease, some commands may fail to be executed smoothly.

SUMMARY OF THE INVENTION

The present invention has been made in view of the aforementioned problems and a general purpose thereof is to provide a multiprocessor system which can achieve flexible processing using small circuits, and a method of executing a program in that system.

To solve the foregoing problem, one of the embodiments of the present invention provides a method of executing a program in a multiprocessor system. In this method, when a first processor executes a call instruction in a running main routine, it delegates to a second processor the task of saving (for later restoration) a return address for returning to the main routine upon completion of processing of a subroutine called by the call instruction.

Another embodiment of the present invention also provides a method of executing a program in a multiprocessor system. In this method, when a first processor executes a call instruction or a jump instruction, it delegates to a second processor the task of acquiring a full address of a call destination address or jump destination address.

Arbitrary combinations of the aforementioned constituting elements, and implementations of the invention in the form of methods, apparatuses, systems, recording media, computer programs, and the like may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Initially, an overview is provided followed by a detail description of an embodiment.

One embodiment of the invention comprises a first processor and a second processor. The first processor includes an interrupt generation unit which generates an interrupt to the second processor when it executes a predetermined call instruction in a running main routine. The second processor includes an address save unit which saves a return address for returning to the main routine upon completion of processing of a subroutine called by the call instruction to a predetermined memory area after receiving an interrupt from the interrupt generation unit. Here, the "main routine" and the "subroutine" are expressions for indicating the relationship between a calling routine and a called routine. For example, a certain routine may be referred to as a "subroutine" with respect to a calling routine, and as a "main routine" with respect to a called routine.

The interrupt generation unit may generate an interrupt to the second processor again when a predetermined return instruction is executed in the subroutine. The second processor may further include an address notification unit which communicates the return address to the first processor when receiving the re-generated interrupt. The first processor may include a fetcher which fetches an instruction, and the return address is set as a target address to be accessed by this fetcher.

Another embodiment of the invention also comprises a first processor and a second processor. The first processor includes an interrupt generation unit which generates an interrupt to the second processor when it executes a predetermined call instruction or jump instruction. The second processor includes: an address extraction unit which extracts a call destination address or a jump destination address stored dividedly in formats of the call instruction or the jump instruction and an accompanying execution stop instruction when it receives the interrupt from the first processor; and an address notification unit which communicates the acquired call destination address or jump destination address to the first processor. Here, the "jump instruction" may be either a conditional jump instruction or an unconditional jump instruction. The first processor may include a fetcher which fetches an instruction, and the call destination address or jump destination address is set as a target address to be accessed by this fetcher.

Still another embodiment of the invention comprises a graphics processor and a main processor. The graphics processor includes: a direct memory access controller (DMAC) which reads instructions written in a display list in a memory sequentially; a decoder which decodes the read instructions sequentially; and an interrupt generation unit which generates a shift interrupt to the main processor when a decoded instruction is a predetermined call instruction included in a main routine of the display list and generates a return interrupt to the main processor when a decoded instruction is a return instruction included in a subroutine called by the call instruction. The main processor includes: an address save unit which saves a return address for returning to the main routine upon completion of processing of the subroutine to a predetermined memory after receiving the shift interrupt from the interrupt generation unit; and an address notification unit which reads the return address in the predetermined memory and communicates it to the graphics processor when it receives the return interrupt from the interrupt generation unit. The return address communicated to the graphics processor is set as a target address to be accessed by the DMAC.

Still another embodiment of the invention also comprises a graphics processor and a main processor. The graphics processor includes: a DMAC which reads instructions written in a display list in a memory sequentially; a decoder which decodes the read instructions sequentially; and an interrupt generation unit which generates an interrupt to the main processor when a decoded instruction is a predetermined call instruction or jump instruction included in the display list. The main processor includes an address notification unit which acquires a call destination address or a jump destination address stored dividedly in formats of the call instruction or the jump instruction and an accompanying execution stop instruction, and communicates the same to the graphics processor when it receives the interrupt from the interrupt generation unit. The call destination address or jump destination address communicated to the graphics processor is set as a target address to be accessed by the DMAC.

If a stack area inside the first processor has a free space, the first processor may save the return address to the stack area by itself. On the other hand, if the stack area has no free space, the save of the return address may be delegated to the second processor. If the call instruction does not explicitly instruct to delegate the save of the return address to the second processor, the first processor may save the return address to a stack area built in itself. On the other hand, if the call instruction explicitly instructs to delegate the task of saving the return address to the second processor, the first processor may delegate the task of saving the return address to the second processor.

If the number of bits of the call destination address or jump destination address exceeds the number of bits that the first processor can acquire, the acquisition of the full address of the call destination address or jump destination address may be delegated to the second processor. If the call instruction or jump instruction explicitly instructs to delegate the task of acquiring the call destination address or jump destination address to the second processor, the acquisition of the full address of the called destination address or jump destination address may be delegated to the second processor.

Hereinafter, an embodiment of the present invention will be described in detail.

Figure 1:
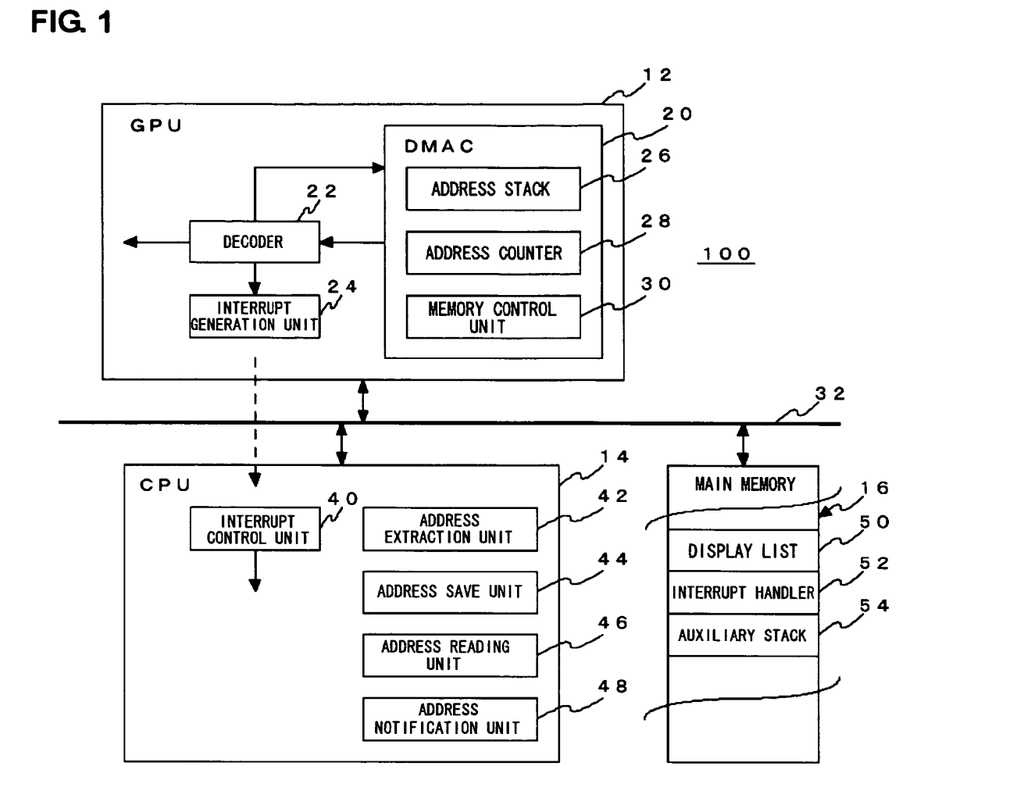
FIG. 1 is a diagram showing the configuration of a multiprocessor system according to an embodiment of the present invention.

FIG. 1 is a diagram showing the configuration of a multiprocessor system 100 according to one embodiment of the present invention. The multiprocessor system 100 according to the present embodiment comprises a GPU 12, a CPU 14, and a main memory 16 which are connected onto an identical bus 32. Furthermore, the block diagram of FIG. 1 shows the functions and data structures pertaining to the GPU 12, the CPU 14, and the main memory 16 to the extent necessary for the purpose of describing the present embodiment. Their typical functions and data structures are omitted from the diagram.

The GPU 12 is a processor for graphics processing, primarily in charge of computing and rendering necessary for three-dimensional graphics display. It may be made of a single-chip semiconductor integrated circuit. The GPU 12 includes a DMAC 20, a decoder 22, and an interrupt generation unit 24. The DMAC 20 performs data transfer directly with the main memory 16. In the present embodiment, the DMAC 20 functions as a fetcher which fetches commands from the main memory 16.

The DMAC 20 includes an address stack 26, an address counter 28, and a memory control unit 30. When the GPU 12 suspends currently-running drawing processing due to the occurrence of an interrupt, and executes a callback function or the like, the address stack 26 stores return addresses which the GPU 12 returns to, such that the GPU resumes the foregoing drawing processing after completion of the subroutine pertaining to the callback function. In the present embodiment, a small area is allocated for the address stack 26 since downsizing is a requirement of the GPU 12. For instance, two registers may be arranged to store two return addresses. According to this design, even when two call instructions are executed to construct two stages of subroutines, the two return addresses can be stored in this address stack 26. If additional call instructions are executed, the return addresses must be stored in another area. The technique of how to secure that area will be described later. The address counter 28 holds an address to be accessed. In the present embodiment, the address counter 28 holds an address of the main memory 16. The address counter 28 increments the address according to data read timing. The memory control unit 30 controls data transfer with the main memory 16. Specifically, the memory control unit 30 reads data from the address designated by the address counter 28.

The decoder 22 decodes commands fetched by the DMAC 20 sequentially. Depending on the decoding results, a operation unit (not shown) having adders and the like executes the commands, and writes the results of the operation to a frame memory (not shown) or the like. If the decoded command is an interrupt-generating call instruction in a display list 50 to be described later, the decoder 22 reads an interrupt handler 52. When the interrupt handler 52 is executed, the decoder 22 suspends the currently-running drawing processing, and stores the return address for returning to that processing into the address stack 26. It should be appreciated that not every return address needs to be stored unless the drawing processing is suspended. If the address stack 26 has no free space, the decoder 22 instructs the interrupt generation unit 24 to request that the CPU 14 store the return address.

When storing the return address, the decoder 22 reads a callback function hooked by default. For example, the callback function is called by using an argument which is set in the lower 16 bits of the decoded command format. Here, the currently-running drawing processing may be either suspended or continued. If the drawing processing is suspended, the suspended processing may be resumed when returning from the callback processing. The processing may also be resumed when another command for instructing to resume the drawing processing is decoded. These settings may be written in a command format in advance as a command type. The settings may also be effected depending on the presence or absence of an execution stop instruction such as a halt instruction.

Suppose that the decoded command is one which generates an interrupt, generates a call instruction or jump instruction in the display list 50 to be described later, and contains only part of a target address to be accessed. In this case, the decoder 22 instructs the interrupt generation unit 24 to request that the CPU 14 extract the target address of the display list 50. For a call instruction, a return address is stored as described previously. In the present embodiment, this target address is set across a plurality of commands if it cannot be accommodated in a single command format. For example, when using a command system where a command of a call instruction or jump instruction for generating an interrupt in the display list 50 is written with an accompanying command of a halt instruction or one containing an end marker, the target address can be set in those two commands dividedly. Provided that the target address is specified in 32 bits and each single command has an area available for addressing 24 bits or less, the target address may be divided into 16 bits each and set into two command formats.

Furthermore, if the address has a data length capable of being set in a single command and is set in a single command, the decoder 22 will not request the address extraction of the CPU 14. In that case, the decoder 22 can give the address to the address counter 28 as usual. Whether or not the target address is set in a plurality of commands dividedly may be written in a command format as a command type in advance, so that it is determined by decoding the command type. The presence or absence of an execution stop instruction may also be used for such a determination.

If the decoded command is one which causes an interrupt and generates a return instruction corresponding to the call instruction, the decoder 22 reads the return address corresponding to the call instruction from the address stack 26 or an auxiliary stack area 54 in the main memory 16, to be described later. If the return address is stored in the auxiliary stack area 54, the decoder 22 instructs the interrupt generation unit 24 to request that the CPU 14 read the return address.

In summary, the interrupt generation unit 24 generates an interrupt signal to the CPU 14 upon the occurrence of the following events: One is when requesting the CPU 14 to store a return address. Another is when requesting the CPU 14 to extract an address that is set in a plurality of commands dividedly. A still further event generating an interrupt signal to the CPU 14 is when requesting the CPU 14 to transfer a return address if a return instruction for returning to the calling source is executed in a subroutine and the return address is stored in the auxiliary stack area 54 in the main memory 16. Hereinafter, in this specification, an interrupt signal that is issued to the CPU 14 when a predetermined call instruction included in the main routine of the display list 50 is decoded and executed will be referred to as a "shift interrupt." Also, an interrupt signal that is issued to the CPU 14 when a return instruction included in a subroutine that is called by a call instruction is decoded and executed will be referred to as a "return interrupt." Furthermore, interrupts can be generated by various types of events, including keyboard inputs. Nevertheless, description shall be limited to interrupts that occur when decoding and executing a call instruction or jump instruction while the GPU 12 is executing drawing processing pertaining to the present embodiment.

The CPU 14 includes an interrupt control unit 40, an address extraction unit 42, an address save unit 44, an address reading unit 46, and an address notification unit 48. These units represent functional blocks for achieving the functions of the interrupt handler 52, to be described later. The interrupt control unit 40 accepts a shift interrupt and a return interrupt from the interrupt generation unit 24 of the GPU 12. The address extraction unit 42, when requested by the shift interrupt to extract a target address from across a plurality of commands, extracts parts of the address from the respective commands. For example, the address extraction unit 42 extracts an address that is dividedly set in the formats of the command of a call instruction, a jump instruction, or the like, and the accompanying command of a halt instruction and so forth. This target address designates a call destination address or jump destination address in the main memory 16.

The CPU 14 includes a group of registers (not shown) more than the GPU 12 does. The CPU 14 may also have shift registers. If, for example, a single command format consists of 32 bits and the maximum number of addressing bits is defined as 24 bits, an address defined in 32 bits is divided into two 16 bit portions and set into two commands by using the lower 16 bits of the respective commands. Then, the upper 16 bits of the address are set into the preceding command, and the lower 16 bits are set into the following command. The address extraction unit 42 extracts the upper 16 bits of the address from the preceding command, and puts them into a shift register. The shift register shifts the bits toward the MSB (Most Significant Bit) by 16 digits. In the meantime, the address extraction unit 42 extracts the lower 16 bits of the address from the following command, and combines them with the data in the shift register to restore the undivided address.

The address notification unit 48 transfers the target address generated by the address extraction unit 42 to the GPU 12, thereby setting it into the address counter 28. This procedure updates the data held in the address counter 28, which then starts incrementing from this set address.

The address save unit 44, when requested by the shift interrupt to store the return address, stores the return address into the auxiliary stack area 54 in the main memory 16, to be described later. The auxiliary stack area 54 can store a plurality of return addresses by the LIFO (Last-In First-Out) method.

The address reading unit 46, when requested by the return interrupt to transfer a return address, reads a return address from the auxiliary stack area 54 in the main memory 16. When the auxiliary stack area 54 is controlled by the LIFO method, the address reading unit 46 reads the return address that is last stored. This order of reading matches the order of transfer requests for return addresses from the GPU 12.

The address notification unit 48 transfers the return address read by the address reading unit 46 to the GPU 12, thereby setting it into the address counter 28. This procedure updates the data held in the address counter 28, which then starts incrementing from this set address.

The main memory 16 stores various types of commands and data. In the present embodiment, the main memory 16 primarily stores a display list 50 and an interrupt handler 52. Texture data and the like may also be stored. In addition, the auxiliary stack area 54 is reserved in the main memory 16. The display list 50 contains groups of drawing-related commands which are listed collectively for the sake of effective processing when performing drawing. In the present embodiment, the display list 50 is fetched into the GPU 12 for execution. The interrupt handler 52 is a program which is waiting in order to process and control interrupts. In the present embodiment, the interrupt handler 52 chiefly controls the operation of the GPU 12 and the CPU 14 when a call instruction or jump instruction is executed while the display list 50 is in operation.

The auxiliary stack area 54, as employed in the present embodiment, is an area that is reserved for storing the return addresses mentioned above. For example, the auxiliary stack area 54 stores transferred return addresses sequentially from the bottom area toward the top address of the main memory 16. The auxiliary stack area 54 may be reserved according to the number of stages of subroutines to be executed by call instructions.

Figure 2:
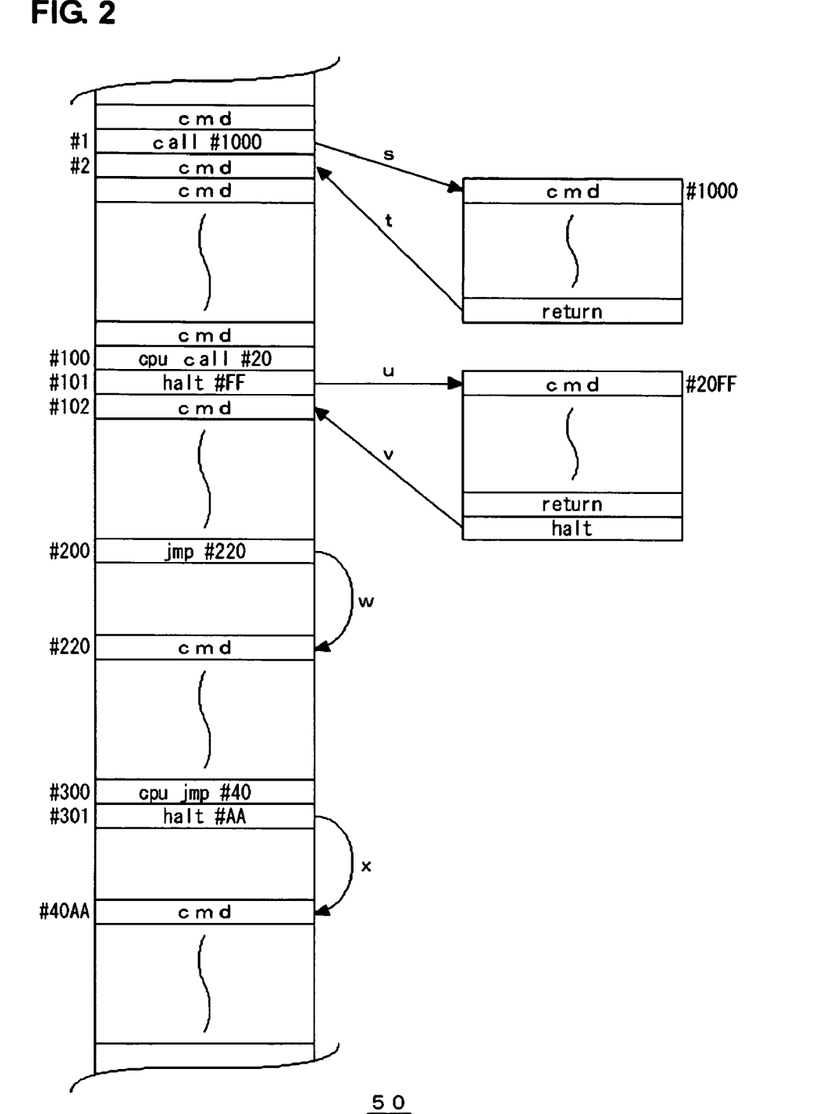
FIG. 2 is a diagram showing an example of a display list according to the embodiment.

FIG. 2 is a diagram showing an example of the display list 50. The DMAC 20 fetches commands successively from the top address of the display list 50 in the main memory. In FIG. 2, a command "cmd" is a generic name for drawing commands. Examples of "cmd" include commands that specify wire frames and polygons for defining primitives, and ones that specify color or the like.

When the decoder 22 decodes a command "call id" stored in address #1, the GPU 12 uses the argument id to call a callback function that is hooked in advance (step s). Here, the symbol # indicates hexadecimal notation. In FIG. 2, the callback function is set in address #1000 in advance. Then, the GPU 12 executes the subroutine starting from address #1000 in order. When the decoder 22 decodes a command "return" which indicates the end of the subroutine, the GPU 12 shifts to return address #2, thereby returning to the main routine (step t). It should be noted this return address is stored in the address stack 26 or the auxiliary stack area 54 in the main memory 16. The return address is stored when the subroutine is called.

Next, when the decoder 22 decodes a command "cpu call #20" stored in address #100, the GPU 12 requests the CPU 14 to extract address #20FF which is dividedly set in that command and a command "halt #FF" stored in the next address #101. The GPU 12 then calls a subroutine that starts from that address #20FF (step u). Then, the GPU 12 executes the subroutine starting from that address #20FF in order. When the decoder 22 decodes a command "return," which indicates the end of the subroutine, and an accompanying command "halt," the GPU 12 shifts to return address #102, thereby returning to the main routine (step v).

Next, when the decoder 22 decodes a command "jmp #220" stored in address #200, the GPU 12 jumps to address #220 (step w). In this case, the jump occurs from branching or the like within the same routine. Since the ptep does not call any subroutine nor return to a calling source after completion, no return address needs to be stored. Here, if it can be written in no more than 24 bits, the address need not be set into a plurality of commands dividedly, but may be set into a single command. This processing is the same as that of an ordinary jump instruction.

Next, when the decoder 22 decodes a command "cpu jmp #40" stored in address #300, the GPU 12 requests the CPU 14 to extract address #40AA which is dividedly set in that command and a command "halt #AA" stored in the next address #301. The GPU 12 then jumps to that address #40AA (step x). It should be noted that "cpu" in the command indicates that the CPU 14 is involved in that procedure.

Figure 3:
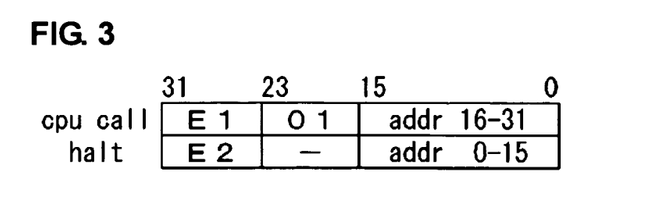
FIG. 3 is a chart showing the format of a first example of a command according to the embodiment, in which a GPU instructs a CPU to extract an address.

FIG. 3 shows the format of a first example of commands according to the present embodiment, in which the GPU 12 instructs the CPU 14 to extract an address. Commands "cpu call" and "halt" are used in combination to execute a call instruction in the display list 50. In FIG. 3, each command is written in 32 bits. The upper eight bits, i.e., the 31st to 24th digits describe a command code. The next eight bits, i.e., the 23rd to 16th digits describe a command type. The lower 16 bits, i.e., the 15th to 0th digits make a data field in which the upper or lower 16 bits of a call destination address are written. The command code is a code given to each individual command. The command type specifies accompanying information as to the execution of the command, such as whether or not to suspend the running processing when generating an interrupt, whether or not a return address must be stored, and whether or not the processing is to be executed by the GPU 12 alone, i.e., the processing requires cooperation with the CPU 14. Note that the foregoing is just an example of the format. Any fields may be created to describe instructions and data as long as the decoder 22 can decode the commands properly. For example, when the instruction part of a command can be written in the top eight bits, the remaining 24 bits may be used as a data field for describing an address or argument.

Figure 4:
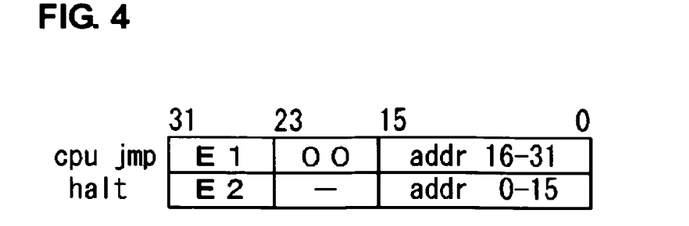
FIG. 4 is a chart showing the format of a second example of a command according to the embodiment, in which the GPU instructs the CPU to extract an address.

FIG. 4 shows the format of a second example of commands according to the present embodiment, in which the GPU 12 instructs the CPU 14 to extract an address. Commands "cpu jmp" and "halt" are used in combination to execute a jump instruction in the display list 50. Examples of this jump instruction include a branching jump instruction and an unconditional jump instruction. In FIG. 4, as in FIG. 3, the lower 16 bits of field of each command describes the upper or lower 16 bits of the jump destination address.

Figure 5:
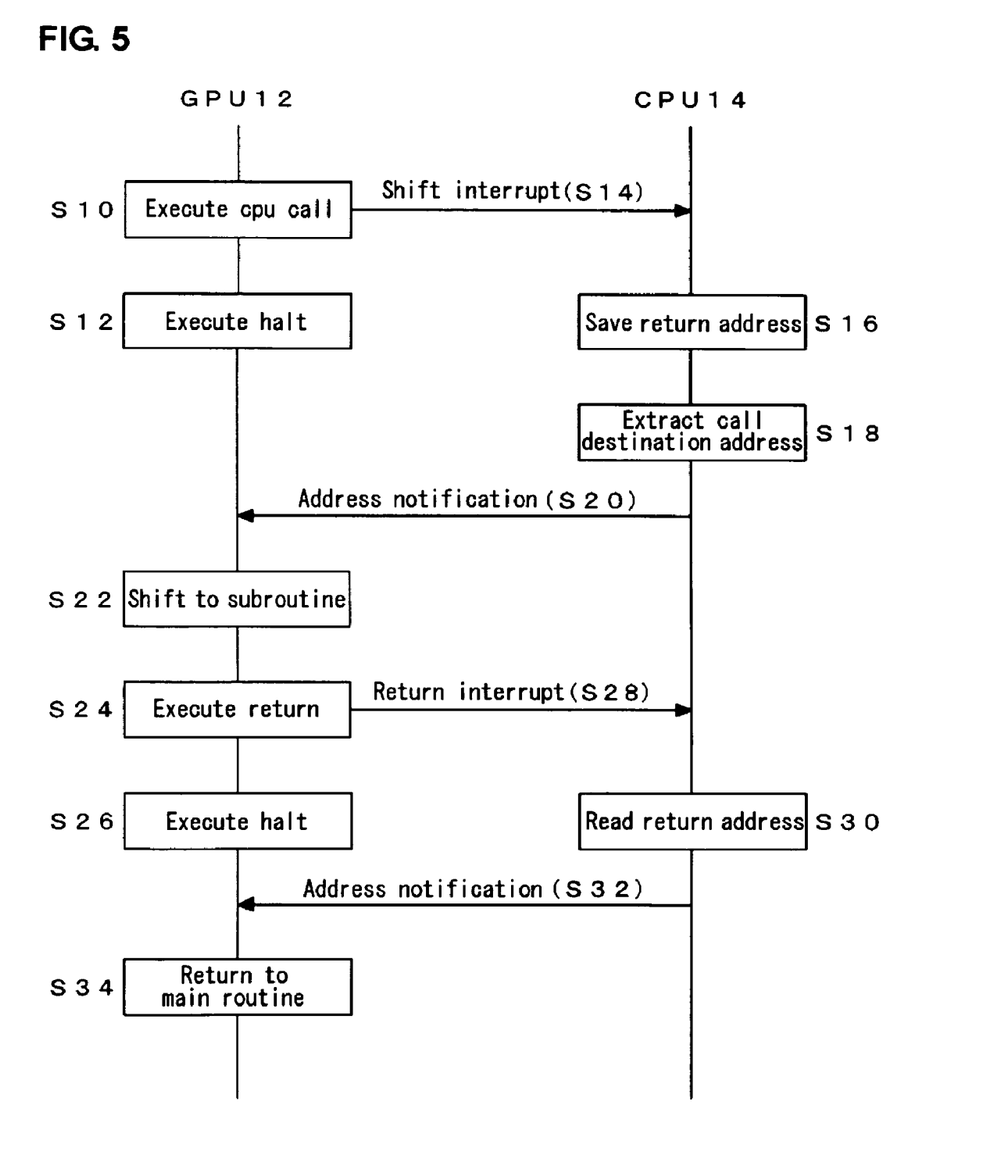
FIG. 5 is a flowchart for the case of executing a call instruction according to the embodiment.

FIG. 5 is a flowchart for the case of executing a call instruction according to the present embodiment. When the decoder 22 decodes a command "cpu call," the GPU 12 executes the command (S10). Then, the decoder 22 decodes the next command "halt," and the currently-running processing is suspended (S12). In the meantime, the GPU 12 generates a shift interrupt to the CPU 14 (S14).

In response to this shift interrupt, the CPU 14 saves the return address for returning to the calling main routine that has been running on the GPU 12 to the auxiliary stack area 54 in the main memory 16 (S16). Meanwhile, the CPU 14 extracts the call destination address which is dividedly stored in the foregoing commands "cpu call" and "halt" (S18). Then, the CPU 14 communicates the call destination address to the GPU 12 (S20).

The GPU 12 shifts to the subroutine that starts from the call destination address (S22). The GPU 12 executes the subroutine in order until the decoder 22 decodes a command "return," and executes that command (S24). The decoder 22 decodes the next command "halt," and the currently-running processing is ended (S26). Meanwhile, the GPU 12 generates a return interrupt to the CPU 14 (S28).

In response to this return interrupt, the CPU 14 reads the return address, which has been saved to the auxiliary stack area 54 in the main memory 16 (S30). Then, the return address is communicated to the GPU 12 (S32). According to the return address, the GPU 12 returns to the calling main routine and continues processing (S34).

Note that the processing described above is based on assumption that the address stack 26 of the GPU 12 has no free space. If the address stack 26 has a free space, the return address may be saved thereto instead. The GPU 12 may also be provided with an internal flag register or the like so that a flag for indicating whether or not the address stack 26 has a free space is set on that register. In this case, the decoder 22 can refer to that flag to determine whether or not to request the CPU 14 to save the return address. If the return address is stored in the address stack 26 of the GPU 12, the processing of steps S16 and S28 to S32 in FIG. 5 becomes unnecessary and is replaced with internal processing of the GPU 12.

Figure 6:
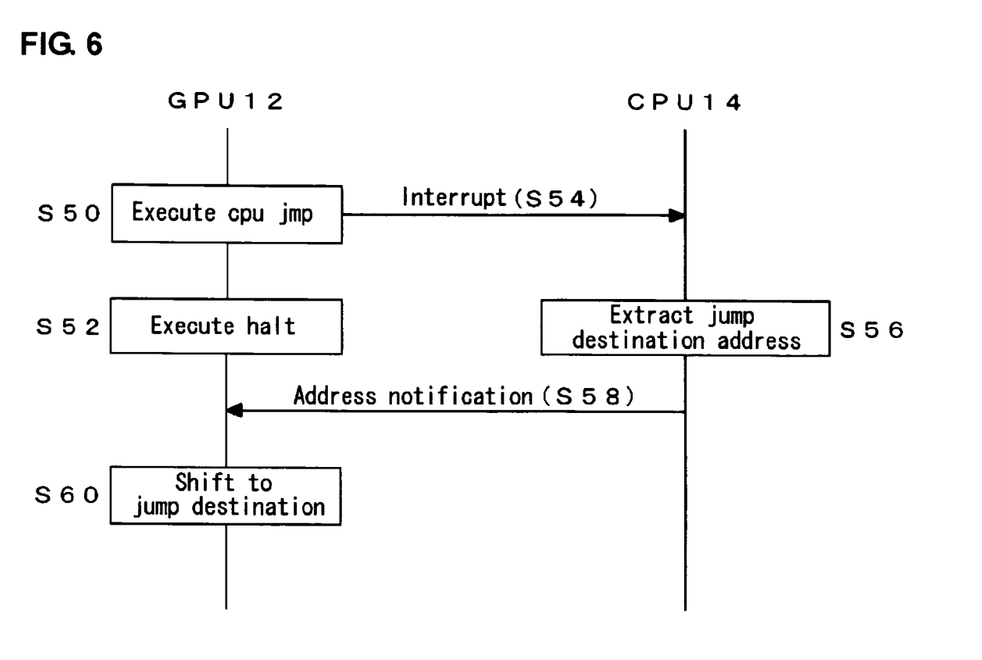
FIG. 6 is a flowchart for the case of executing a jump instruction according to the embodiment.

FIG. 6 is a flowchart for the case of executing a jump instruction according to the present embodiment. When the decoder 22 decodes a command "cpu jmp," the GPU 12 executes that command (S50). The decoder 22 decodes the next command "halt," and the currently-running processing is ended (S52). Meanwhile, the GPU 12 generates an interrupt to the CPU 14 (S54).

In response to this interrupt, the CPU 14 extracts the jump destination address which is dividedly stored in the foregoing commands "cpu jmp" and "halt" (S56). Then, the jump destination address is communicated to the GPU 12 (S58). The GPU 12 shifts to the jump destination address (S60), and resumes reading from that address.

As described above, in the present embodiment, when a call instruction occurs as an interrupt, the return address for returning to the calling main routine in which the interrupt occurs can be saved to the main memory 16 outside the GPU 12. This makes it possible to reduce the area of the GPU 12 for storing return addresses. That is, when processing in which a called routine generates a call instruction further is performed a plurality of times to construct a plurality of stages of subroutines, a plurality of return addresses for returning to the calling routines must be retained. Storing all these return addresses inside the GPU 12 requires many registers, and the GPU 12 therefore becomes hard to downsize. Conversely, when the registers of the GPU 12 are decreased for downsizing, it becomes difficult to construct a plurality of stages of subroutines without a drop in processing flexibility. Therefore, it is an advantage of the present embodiment that both downsizing and flexible processing of the GPU 12 can be achieved as return addresses can be saved to the main memory 16. Specifically, even a GPU 12 that has simple hardware resources can process multiple stages of call instructions.

Moreover, if a call destination address or jump destination address cannot be accommodated in a single command field and thus is set across a plurality of commands, the extraction of the address can be delegated to the CPU 14. This makes it possible to decrease the registers of the GPU 12. That is, when extracting an address set across a plurality of commands, registers for extracting part of the address included in each of the commands, shifting the same, and synthesizing the same are required. Those registers are greater in scale than registers that are necessary for extracting an argument or address set in a single command. Therefore, in accordance with the present embodiment, the decoding of commands which requires such logical operations as shifting and addition is delegated to the main CPU 14, including the extraction of addresses dividedly set in a plurality of commands. Consequently, the GPU 12 has only to have sufficient registers necessary for processing commands that can be decoded one by one. It is therefore possible to reduce the circuit area and therefore achieve downsizing. Moreover, since commands that are difficult for the hardware resources of the GPU 12 to decode are instead decoded by the CPU 14, a variety of description systems of commands can be handled. This makes it possible to achieve both the downsizing and flexible processing of the GPU 12. When the GPU 12 is downsized, the entire multiprocessor system can be downsized.

Described above is an explanation based on the embodiment. The embodiment is only illustrative in nature and it will be obvious to those skilled in the art that variations in constituting elements and processes are possible within the scope of the present invention. For example, the embodiment has dealt with the configuration in which the GPU 12 has the address stack 26. Instead, the GPU 12 may not be provided with the address stack 26, and all the return addresses may be stored into the stack area in the main memory 16. This allows further downsizing of the GPU 12.

In the embodiment, the call destination address and the jump destination address are dividedly set into two commands each. Alternatively, the addresses may be divided and set into three or more commands each, in cases such as when each single command has a smaller data field, and when the addresses to be set have greater data lengths. This allows flexible definitions of command description systems. Moreover, shorter command formats allow further downsizing of the hardware resources of the GPU 12.

What is claimed is:

1. A multiprocessor system comprising a first processor and a second processor, wherein:
the first processor comprises an interrupt generation unit which generates an interrupt to the second processor when the first processor executes a predetermined call instruction in a running main routine, the interrupt being for requesting to store a return address for returning to the main routine upon completion of processing of a subroutine called by the call instruction, wherein the main routine and the subroutine are performed only by the first processor and not by the second processor; and
the second processor comprises an address save unit which saves the return address to a predetermined memory area when the second processor receives an interrupt from the interrupt generation unit.

2. The multiprocessor system according to claim 1, wherein:
the interrupt generation unit generates an interrupt to the second processor again when a predetermined return instruction is executed in the subroutine; and
the second processor further comprises an address notification unit which communicates the return address to the first processor when receiving the re-generated interrupt.

3. The multiprocessor system according to claim 1, wherein
the first processor comprises a fetcher which fetches an instruction; and the return address is set as a target address to be accessed by the fetcher.

4. A multiprocessor system comprising a first processor and a second processor, wherein:
the first processor comprises an interrupt generation unit which generates an interrupt to the second processor when the first processor executes a predetermined call instruction or a jump instruction, the interrupt being for requesting to extract a call destination address or a jump destination address written dividedly in two instruction codes in formats of the call instruction or the jump instruction and an accompanying execution stop instruction, both of which are written in a memory in advance, wherein both the call instruction or the jump instruction and an instruction written in the call destination address or the jump destination address are executed only by the first processor; and
the second processor comprises:
an address extraction unit which extracts the call destination address or the jump destination address when the second processor receives the interrupt from the first processor; and
an address notification unit which communicates the acquired call destination address or jump destination address to the first processor.

5. The multiprocessor system according to claim 4, wherein:
the first processor further comprises a fetcher which fetches an instruction; and
the call destination address or the jump destination address is set as a target address to be accessed by the fetcher.

6. A multiprocessor system comprising a graphics processor and a main processor, wherein
the graphics processor comprises:
a direct memory access controller (DMAC) which reads instructions written in a display list from a memory sequentially;
a decoder which decodes the read instructions sequentially; and an interrupt generation unit which generates a shift interrupt to the main processor when a decoded instruction is a predetermined call instruction included in a main routine of the display list and generates a return interrupt to the main processor when a decoded instruction is a return instruction included in a subroutine called by the call instruction and performed by the graphics processor, the shift interrupt being for requesting to store a return address for returning to the main routine upon completion of processing of the subroutine, and the return interrupt being for requesting to transfer the return address, wherein the main routine and the subroutine are performed only by the graphics processor and not by the main processor, the main processor comprises:

an address save unit which saves the return address to a predetermined memory when the main processor receives the shift interrupt from the interrupt generation unit; and an address notification unit which reads the return address from the predetermined memory and communicates the return address to the graphics processor when the main processor receives the return interrupt from the interrupt generation unit, and the return address communicated to the graphics processor is set as a target address to be accessed by the DMAC.

7. A multiprocessor system comprising a graphics processor and a main processor, wherein the graphics processor comprises:

a direct memory access controller (DMAC) which reads instructions written in a display list from a memory sequentially;

a decoder which decodes the read instructions sequentially; and an interrupt generation unit which generates an interrupt to the main processor when a decoded instruction is a predetermined call instruction or a jump instruction included in the display list, the interrupt being for requesting to extract a call destination address or a jump destination address written dividedly in two instruction codes in formats of the call instruction or the jump instruction and an accompanying execution stop instruction, both of which are written in a memory in advance, wherein both the call instruction or the jump instruction and an instruction written in the call destination address or the jump destination address are executed only by the graphics processor, the main processor comprises an address notification unit which acquires the call destination address or the jump destination address, and communicates the call destination address or the jump destination address to the graphics processor when the main processor receives the interrupt from the interrupt generation unit, and the call destination address or the jump destination address communicated to the graphics processor is set as a target address to be accessed by the DMAC.

8. A method of executing a program in a multiprocessor system, the method comprising, executing a call instruction in a main routine running by a first processor, and generating an interrupt for delegating to a second processor the task of saving a return address for returning to the main routine upon completion of processing of a subroutine called by the call instruction and performed by the first processor, wherein the main routine and the subroutine are performed only by the first processor and not by the second processor.

9. The method of executing a program in a multiprocessor system according to claim 8, wherein:

if a stack area inside the first processor has a free space, the first processor saves the return address to the stack area by itself; and if the stack area has no free space, the save of the return address is delegated to the second processor.

10. The method of executing a program in a multiprocessor system according to claim 8, wherein:

if the call instruction does not explicitly instruct to delegate the task of saving the return address to the second processor, the first processor saves the return address to a stack area built in itself; and if the call instruction explicitly instructs to delegate the task of saving the return address to the second processor, the first processor delegates the task of saving the return address to the second processor.

11. A method of executing a program in a multiprocessor system, the method comprising, executing a call instruction or a jump instruction by a first processor, generating an interrupt for delegating a task of acquiring a full address of a call destination address or a jump destination address written dividedly in two instruction codes in formats of the call instruction or the jump instruction and an accompanying execution stop instruction to a second processor, both of which are written in a memory in advance, wherein both the call instruction or the jump instruction and an instruction written in the call destination address or the jump destination address are executed only by the first processor.

12. A method of executing a program in a multiprocessor system according to claim 11, wherein delegating a task of acquiring the full address of the call destination address or the jump destination address to a second processor, if the number of bits of the call destination address or the jump destination address exceeds the number of bits acquirable by the first processor.

13. A method of executing a program in a multiprocessor system according to claim 11, wherein delegating the task of acquiring the full address of the call destination address or the jump destination address to a second processor if the call instruction or the jump instruction explicitly instructs to delegate the task of acquiring the call destination address or the jump destination address to the second processor.

* * * * *